Figures 1, 2:
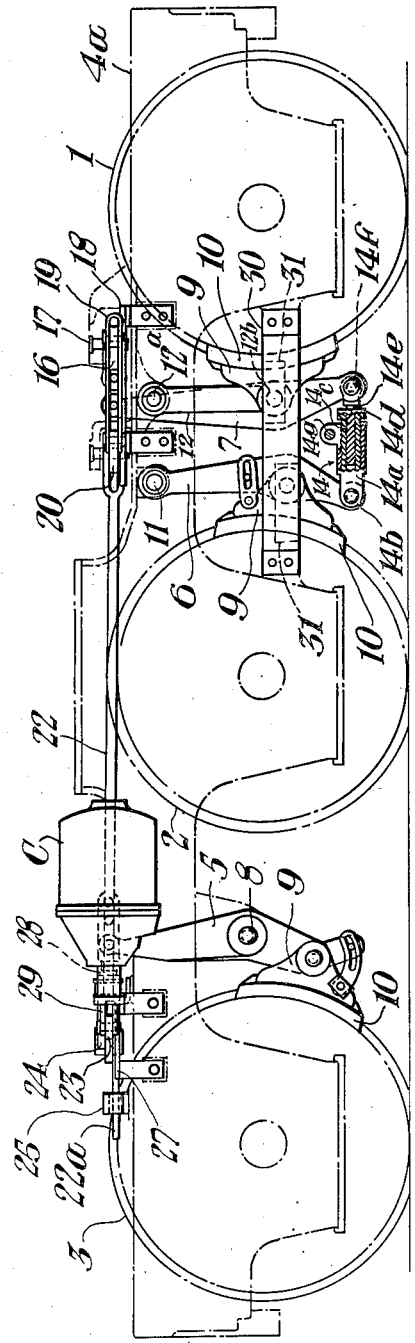

May 24, 1949.  T. C. CROSSMAN  2,471,313
BRAKE RIGGING
Filed June 21, 1947  2 Sheets-Sheet 1

INVENTOR.
Theodore C. Crossman
BY
HIS ATTORNEY

Patented May 24, 1949

2,471,313

UNITED STATES PATENT OFFICE 2,471,313

BRAKE RIGGING

Theodore C. Crossman, Wilkinsburg, Pa., assignor to the American Brake Company, Swissvale, Pa., a corporation of Missouri Application June 21, 1947, Serial No. 756,206

6 Claims. (Cl. 188—46)

My invention relates to brake rigging, and particularly to brake rigging suitable for, although in no way limited to, use on a cast frame type of a six-wheel motor truck for a Diesel electric locomotive.

One object of my invention is to provide a brake rigging of the type described which can be conviently mounted on the motor truck within the limited space available for brake rigging.

According to my invention, I provide each wheel of the truck with a single brake shoe, and I employ a separate brake cylinder and linkage for actuating the brake shoes on each side of the truck. The brake cylinder on each side of the truck is secured to the truck frame outboard of the wheels between the middle and rear wheels of the truck on a plane level with the tops of the wheels and has its piston rod connected with the outer end of a first transversely extending floating equalizer lever. This equalizer lever is slidably supported at spaced points on equalizer supports secured to the side frame of the truck and is operatively connected at its inner end through the medium of a combined double jaw and slack adjuster with the upper end of a first hanger lever. The said first hanger lever is pivotally attached to the truck frame intermediate its ends, and supports at its lower end the brake shoe for the rear wheel of the truck. The said first floating equalizer lever is pivotally connected intermediate its ends with one end of a pull rod the other end of which is pivotally connected with a transversely extending dead lever intermediate its ends. Said dead lever is pivotally attached at its inner end to the truck frame, and is slidably supported adjacent its outer end on a lever support which also serves to support the outer end of a second equalizer lever. Said second equalizer lever is pivotally attached to the truck frame intermediate its ends and is operatively connected at its outer end with the outer end of said dead lever by means of a strap link. The inner end of said second equalizer lever is connected by means of a pair of clevices with the upper end of a hanger lever which is floatingly supported from the truck frame at the rear side of the front wheel of the truck by means of hanger links and which is operatively connected at its point of attachment with the hanger links to the brake shoe for the front wheel of the truck. The lower end of said floating hanger lever is connected through a slack adjuster with the lower end of a third hanger lever which is pivotally attached at its upper end to the truck frame at the forward side of the middle wheel of the truck, and which is operatively connected intermediate its ends with the brake shoe for the middle wheel of the truck.

Other objects and characteristic features of my invention will become apparent as the description proceeds.

I shall describe one form of brake rigging embodying my invention and shall then point out the novel features thereof in claims.

Figure 3:
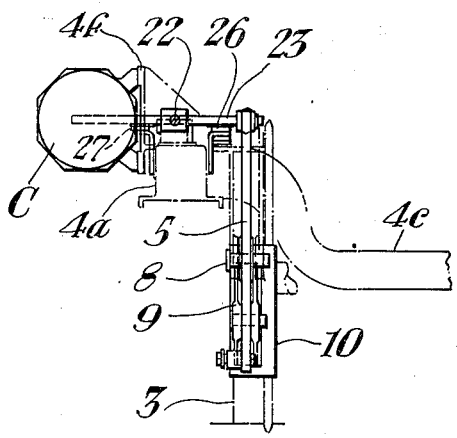
Figure 4:
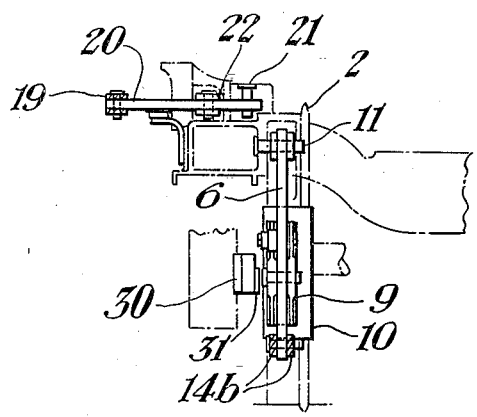
Figure 5:
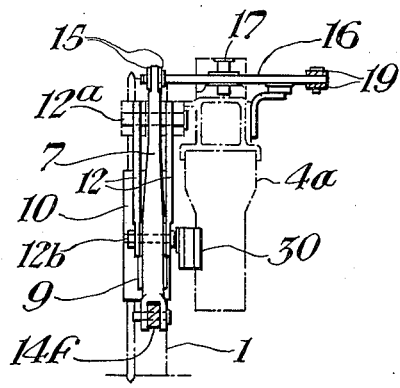

In the accompanying drawings, Fig. 1 is a side elevational view of a Diesel electric locomotive truck of the cast frame type provided with one form of brake rigging embodying my invention. Fig. 2 is a top plan view of that portion of the brake rigging embodying my invention which is applied to one side of the truck, it being understood that the portion which is applied to the other side of the truck is identical with the portion shown. Fig. 3 is a view partly in section and partly in elevation of that portion of the brake rigging which is associated with the third wheel of the truck as it appears when viewed from the right in Fig. 1. Fig. 4 is a view partly in section and partly in elevation of that portion of the brake rigging which is associated with the second wheel of the truck as it appears when viewed from the right in Fig. 1. Fig. 5 is a view partly in section and partly in elevation of that portion of the brake rigging which is associated with the first wheel of the truck as it appears when viewed from the left in Fig. 1.

Similar reference characters refer to similar parts in each of the several views.

Referring to the drawings, the reference characters 1, 2, and 3 designate, respectively, the front, middle, and rear wheels at one side of a six-wheel motor truck for a Diesel electric locomotive. Only one-half of the truck is shown because the other half is similar to the half which is shown, and it should be pointed out at the outset that in the description which follows the half of the truck which is not shown will be provided with brake rigging which is a duplicate of that which I shall now describe.

The truck frame may have any suitable type construction, but as here illustrated the truck frame is of the cast type and includes spaced side members 4a connected by transversely extending end members 4b and 4c and spaced transversely extending center members or transoms 4d and 4e. The means for supporting the truck frame by the wheels are not shown because these means are well known and comprise no part of my present invention.

The brake rigging as shown comprises a combined brake cylinder and hanger lever 5 disposed at the forward side of the rear wheel 3, a hanger lever 6 disposed at the forward side of the middle wheel 2, and a hanger lever 7 disposed at the rear side of the front wheel 1 of the truck. The hanger lever 5 is pivotally attached intermediate its ends to the truck frame by means of a pivot pin 8, and is provided at its lower end with a brake head 9 carrying a brake shoe 10 for engagement with the tread of the associated wheel 3.

The hanger lever 6 is pivotally attached at its upper end to the truck frame by means of a pivot pin 11 and has pivotally attached thereto intermediate its ends a brake head 9 carrying a brake shoe 10 for engagement with the second or middle wheel 2 of the truck.

The hanger lever 7 is floatingly supported from the truck frame by means of hanger links 12 which are pivotally attached at their upper ends to the truck frame by means of a pivot pin 12a, and which are pivotally attached at their lower ends to the hanger lever 7 intermediate its ends by means of a pivot pin 12b. A brake head 9 carrying a brake shoe 10 for engagement with the tread of the front or first wheel of the truck is operatively connected with the hanger lever 7 intermediate its ends by means of the same pivot pin 12b which serves to support the hanger lever on the lower ends of the hanger links 12. The two hanger levers 6 and 7 are operatively connected at their lower ends by means of a slack adjuster 14.

The slack adjuster 14, as here shown, is of a compact type which is capable of taking up a considerable amount of slack in the brake rigging, and comprises an outer housing 14a which is generally cylindrical in shape and is closed at one end by an end wall formed with an integral jaw 14b which straddles the lower end of the hanger lever 6. The housing 14a is internally threaded and cooperates with the similarly threaded outer surface of a sleeve member 14c. The sleeve member 14c is provided at its outer end with a flanged portion 14d which is shaped so as to provide a wrench grip to enable the sleeve portion to be readily screwed into or out of the outer housing 14a, and is internally threaded with threads which are disposed in the opposite direction from the threads which cooperate with the threads in the outer housing 14a. A link member 14e is screwed into the sleeve 14d and is provided at its outer end with an eye 14f which is disposed between spaced jaws provided on the lower end of the floating hanger lever 7. It will be obvious that rotation of the sleeve member 14d in one direction will increase the distance between the jaw 14b and eye 14f, whereas rotation of this sleeve member in the opposite direction will decrease the distance between the jaw and eye. The housing at the end opposite to the jaw 14b is split, and is provided with two laterally extending lugs through which a bolt 14g extends by means of which the two lugs may be drawn toward each other to lock the sleeve portion in any adjusted position to which it is rotated.

It will be noted that the slack adjuster structure just described is unusually compact, and requires a minimum of overall length to provide a given range of slack take up for the brake rigging.

The floating hanger lever 7 is operatively connected at its upper end by means of a pair of clevices 15 with the inner end of a transversely extending equalizer lever 16 which is pivotally attached intermediate its ends to the truck frame by means of a pivot pin 17, as will be obvious. The equalizer lever 16 is slidably supported adjacent its outer end by means of a supporting bracket 18 secured to the side frame 4a of the truck, and is operatively connected at its outer end by means of a strap link 19 with the outer end of a dead lever 20. The dead lever 20 is slidably supported adjacent its outer end by means of the same supporting bracket 18 which supports the outer end of the lever 16, and is pivotally attached at its inner end to the truck frame by means of a pivot pin 21.

Intermediate its ends, the dead lever 20 is operatively connected with one end of a pull rod 22, the other end of which is pivotally connected with a floating equalizer lever 23 intermediate its ends. The pull rod 22 at the end which is operatively connected with the floating equalizer lever 23 is provided with spaced jaws 22a which straddle the equalizer lever and through which the pivot pin 24 extends. The lower jaw 22a is considerably longer than the upper jaw and is slidably received within a pull rod guide 25 secured to the upper edge of the side frame 4a of the truck.

The floating equalizer lever 23 is slidably supported on opposite sides of the pull rod 22 by means of supporting brackets 26 and 27 bolted to the side frame 4a, and is operatively connected at its inner end by means of a combined slack adjuster and double jaw 28 with the upper end of the previously referred to hanger lever 5. The combined double jaw and slack adjuster 28 is of well-known construction and by itself forms no part of my present invention.

The outer end of the floating equalizer lever 23 is operatively connected with the push rod 29 of a brake cylinder C. The brake cylinder C is secured to a support 4f cast integral with the truck frame, and is disposed outboard of the wheels between the middle and rear wheels of the truck on a plane level with the tops of the wheels. The brake cylinder is of the usual type, and includes the usual cylinder portion (not shown), return spring (not shown), and push rod 29 operated by the piston.

In operation, when fluid pressure is supplied to the brake cylinder C, the push rod 29 is forced outwardly in the cylinder, and this outward movement of the push rod first causes the equalizer lever 23 to rotate about the pivot pin 24 in a clockwise direction to a position in which the brake shoe 10 carried by the hanger lever 5 is moved into frictional engagement with the wheel 3 of the truck whereupon the equalizer lever 23 then pivots about its point of connection with the combined slack adjuster and double jaw 28 and thereby moves the pull rod 22 to the left. This latter movement in turn acts through the dead lever 20, strap link 19, equalizer lever 16, clevices 15, and hanger lever 7 to move the brake shoe 10 associated with the hanger lever 7 into frictional engagement with the wheel 1 at which time the floating hanger lever 7 then rotates about the pivot pin 12b in a clockwise direction and acts through the slack adjuster 14 and hanger lever 6 to move the brake shoe 10 associated with the hanger lever 6 into frictional engagement with the wheel 2.

To release the brakes, the fluid which was supplied to the brake cylinder C to apply the brakes is vented from the brake cylinder, whereupon the force due to the release spring disposed within the brake cylinder together with the force of gravity acting on the hanger levers acts to move the hanger levers and hence the brake shoes to their released positions.

To assist in maintaining the brake shoes 10 associated with the wheels 1 and 2 in proper engagement with the treads of these wheels when the brakes are applied, a brake head pin guide 30 is bolted or otherwise secured to the journal box housings of the side frame and is provided with wear plates 31 disposed to be engaged by the ends of the pivot pins which secure the brake heads to the hanger levers in response to any lateral displacement of the brake shoes from their normal operative positions with respect to the treads of the wheels 1 and 2.

It should be particularly noted that with the brake rigging constructed in the manner described substantially all parts of the brake rigging with the exception of the hanger levers and associated brake heads and brake shoes are disposed outboard of the wheels where they will not interfere with any part of the driving mechanism for these wheels and where access to the various parts of the brake rigging for inspection and repair can be had. The driving mechanism for driving the wheels is not shown but it will be understood that this driving mechanism comprises an integral part of the motor truck and utilizes substantially all space which is available around the axles between the wheels so that no space is available in this part of the truck for any part of the brake rigging.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. A brake rigging for a six wheel truck comprising in combination with the truck frame, a first hanger lever pivotally attached intermediate its ends to the truck frame at the forward side of the one rear wheel of the truck and provided at its lower end with means for frictionally engaging said one rear wheel, a second hanger lever pivotally suspended from the truck frame at the forward side of the one middle wheel of the truck and provided intermediate its ends with means for frictionally engaging said one middle wheel, a third hanger lever supported intermediate its ends at the rear side of the one forward wheel of the truck and provided intermediate its ends with means for frictionally engaging said one forward wheel, means operatively connecting the lower ends of said second and third hanger levers, a brake cylinder secured to the truck frame outboard of the wheels between said one rear wheel and said middle wheel, a transversely extending floating equalizer lever connected at its outer end with said brake cylinder and at its inner end with the upper end of said first hanger lever, a second transversely extending equalizer lever pivotally supported intermedate its ends and operatively connected at its inner end with the upper end of said third hanger lever, and means operatively connecting said two equalizer levers.

2. A brake rigging for a six wheel truck comprising in combination with the truck frame, a first hanger lever pivotally attached intermediate its ends to the truck frame at the forward side of the one rear wheel of the truck and provided at its lower end with means for frictionally engaging said one rear wheel, a second hanger lever pivotally suspended from the truck frame at the forward side of the one middle wheel of the truck and provided intermediate its ends with means for frictionally engaging said one middle wheel, a third hanger lever supported intermediate its ends at the rear side of the one forward wheel of the truck and provided intermediate its ends with means for frictionally engaging said one forward wheel, means operatively connecting the lower ends of said second and third hanger levers, a brake cylinder secured to the truck frame outboard of the wheels between said one rear wheel and said middle wheel, a transversely extending floating equalizer lever connected at its outer end with said brake cylinder and at its inner end with the upper end of said first hanger lever, a second transversely extending equalizer lever pivotally supported intermediate its ends and operatively connected at its inner end with the upper end of said third hanger lever, a transversely extending dead lever pivotally attached to the truck frame at its inner end and operatively connected at its outer end with the outer end of said second equalizer lever, and a pull rod connecting said dead lever and said first equalizer lever intermediate their ends.

3. A brake rigging for a six wheel truck comprising in combination with the truck frame, a first hanger lever pivotally attached intermediate its ends to the truck frame at the forward side of the one rear wheel of the truck and provided at its lower end with means for frictionally engaging said one rear wheel, a second hanger lever pivotally suspended from the truck frame at the forward side of the one middle wheel of the truck and provided intermediate its ends with means for frictionally engaging said one middle wheel, a third hanger lever supported intermediate its ends at the rear side of the one forward wheel of the truck and provided intermediate its ends with means for frictionally engaging said one forward wheel, means operatively connecting the lower ends of said second and third hanger levers, a brake cylinder secured to the truck frame outboard of the wheels between said one rear wheel and said middle wheel, a transversely extending floating equalizer lever connected at its outer end with said brake cylinder and at its inner end with the upper end of said first hanger lever, a pull rod provided with spaced jaws which straddle said equalizer lever intermediate its ends, a pivot pin extending through said jaws and through said equalizer lever, the one jaw being extended beyond said equalizer lever and being slidably engaged by a pull rod guide secured to the truck frame, and means operatively connecting the free end of said pull rod with the upper end of said third hanger lever.

4. A brake rigging for a six wheel truck comprising in combination with the truck frame, a first hanger lever pivotally attached intermediate its ends to the truck frame at the forward side of the one rear wheel of the truck and provided at its lower end with means for frictionally engaging said one rear wheel, a second hanger lever pivotally suspended from the truck frame at the forward side of the one middle wheel of the truck and provided intermediate its ends with means for frictionally engaging said one middle wheel, a third hanger lever supported intermediate its ends at the rear side of the one forward wheel of the truck and provided intermediate its ends with means for frictionally engaging said one forward wheel, means operatively connecting the lower ends of said second and third hanger levers, a brake cylinder secured to the truck frame outboard of the wheels between said one rear wheel and said middle wheel, a transversely extending floating equalizer lever connected at its outer end with said brake cylinder and at its inner end with the upper end of said first hanger lever, a pull rod provided with spaced jaws which straddle said equalizer lever intermediate its ends, a pivot pin extending through said jaws and through said equalizer lever, the one jaw being extended beyond said equalizer lever and being slidably engaged by a pull rod guide secured to the truck frame, and means including a dead lever and a second equalizer lever for operatively connecting the free end of said pull rod with the upper end of said third hanger lever.

5. A brake rigging for a six wheel truck comprising in combination with the truck frame, a first hanger lever pivotally attached intermediate its ends to the truck frame at the forward side of the one rear wheel of the truck and provided at its lower end with means for frictionally engaging said one rear wheel, a second hanger lever pivotally suspended from the truck frame at the forward side of the one middle wheel of the truck and provided intermediate its ends with means for frictionally engaging said one middle wheel, a third hanger lever supported intermediate its ends at the rear side of the one forward wheel of the truck and provided intermediate its ends with means for frictionally engaging said one forward wheel, means operatively connecting the lower ends of said second and third hanger levers, a brake cylinder secured to the truck frame outboard of the wheels between said one rear wheel and said middle wheel, a transversely extending floating equalizer lever connected at its outer end with said brake cylinder and at its inner end with the upper end of said first hanger lever, a pull rod provided with spaced jaws which straddle said equalizer lever intermediate its ends, a pivot pin extending through said jaws and through said equalizer lever, the one jaw being extended beyond said equalizer lever and being slidably engaged by a pull rod guide secured to the truck frame, a transversely extending dead lever pivotally attached at its inner end to the truck frame and operatively connected intermediate its ends with the free end of said pull rod, and a second transversely extending equalizer lever pivotally attached intermediate its ends to the truck frame and operatively connected at its outer end with the outer end of said dead lever and at its inner end with the upper end of said third hanger lever.

6. In a brake rigging for a Diesel locomotive truck or the like in combination, a brake cylinder secured to the truck frame outboard of the wheels, a tranversely extending horizontally disposed floating equalizer lever slidably supported at spaced points on lever supports secured to the side frame of the truck, said lever being operatively connected at its outer end with said brake cylinder and at its inner end with means for applying a brake to one wheel of the truck, a pull rod pivotally connected at one end with said lever intermediate its ends and having at said one end means slidably engaging it for guiding said pull rod, and means connected with the free end of said pull rod for applying a brake to the other wheels of the truck on the same side of the truck.

THEODORE C. CROSSMAN.

REFERENCES CITED

The following references are of record in the file of this patent:

UNITED STATES PATENTS

| Number | Name | Date |
| --- | --- | --- |
| 854,449 | Austin | May 21, 1907 |
| 1,901,019 | Blunt | Mar. 14, 1933 |
| 2,112,530 | Holloway | Mar. 29, 1938 |